United States Patent
Wang et al.

(10) Patent No.: US 11,065,610 B2
(45) Date of Patent: Jul. 20, 2021

(54) FENTON-LIKE CATALYTIC MATERIAL WITH DUAL REACTION CENTERS AND PREPARATION METHOD THEREOF

(71) Applicants: Nanjing University, Nanjing (CN); Nanjing University&Yancheng Academy of Environmental Protection Technology and Engineering, Yancheng (CN)

(72) Inventors: Jinnan Wang, Nanjing (CN); Suqian Xu, Nanjing (CN); Zhibin Wen, Nanjing (CN); Lifang Chen, Nanjing (CN); Weilin Bian, Nanjing (CN)

(73) Assignees: NANJING UNIVERSITY, Nanjing (CN); NANJING UNIVERSITY&YANCHENG ACADEMY OF ENVIRONMENTAL PROTECTION TECHNOLOGY AND ENGINEERING, Yancheng (CN)

( * ) Notice: Subject to any disclaimer, the term of this patent is extended or adjusted under 35 U.S.C. 154(b) by 0 days.

(21) Appl. No.: 16/629,316

(22) PCT Filed: Dec. 13, 2018

(86) PCT No.: PCT/CN2018/120812
§ 371 (c)(1),
(2) Date: Jan. 8, 2020

(87) PCT Pub. No.: WO2020/093516
PCT Pub. Date: May 14, 2020

(65) Prior Publication Data
US 2021/0023545 A1 Jan. 28, 2021

(30) Foreign Application Priority Data
Nov. 6, 2018 (CN) .......................... 201811311154.7

(51) Int. Cl.
*B01J 37/08* (2006.01)
*B01J 27/24* (2006.01)
*B01J 35/08* (2006.01)
*B01J 35/10* (2006.01)
*B01J 37/10* (2006.01)
*C02F 1/72* (2006.01)
*C02F 101/30* (2006.01)
*C02F 101/34* (2006.01)
*C02F 101/36* (2006.01)
*C02F 101/38* (2006.01)

(52) U.S. Cl.
CPC ............. *B01J 37/082* (2013.01); *B01J 27/24* (2013.01); *B01J 35/08* (2013.01); *B01J 35/1061* (2013.01); *B01J 37/10* (2013.01); *C02F 1/722* (2013.01); *C02F 1/725* (2013.01); *C02F 2101/308* (2013.01); *C02F 2101/345* (2013.01); *C02F 2101/36* (2013.01); *C02F 2101/38* (2013.01); *C02F 2305/026* (2013.01)

(58) Field of Classification Search
CPC . B01J 37/08; B01J 37/082; B01J 27/24; B01J 35/08; B01J 35/1061; B01J 37/10; C02F 1/722; C02F 1/725; C02F 2101/308; C02F 2101/345; C02F 2101/36; C02F 2101/38; C02F 2305/026
USPC ....................................................... 502/200
See application file for complete search history.

(56) References Cited

FOREIGN PATENT DOCUMENTS

| CN | 104226362 A | 12/2014 |
|----|-------------|---------|
| CN | 105772052 A | 7/2016 |
| CN | 106334565 A | 1/2017 |
| CN | 107469827 A | 12/2017 |
| CN | 107670691 A | 2/2018 |
| CN | 107754782 A | 3/2018 |
| CN | 107930694 A | 4/2018 |
| CN | 108568299 A | 9/2018 |
| WO | 2011111052 A1 | 9/2011 |

OTHER PUBLICATIONS

Jing, Degn et al. Heterogeneous Degradation of Orange II with Peroxymonosulfate Activated by Ordered Mesoporous MaFe2O4, Separation and Purification Technology, Apr. 23, 2016, vol. 167, ISSN: 1383-5866.*

Lai Lyu, et al., Selective H2O2 conversion to hydroxyl radicals in the electron-rich area of hydroxylated C-g-C3N4/CuCo—Al2O3, J. Mater. Chem. A, 2017, pp. 7153-7164, vol. 5.

Suqian Xu, et al., Cu-Al2O3-g-C3N4 and Cu-Al2O3-C-dots with dual-reaction centres for simultaneous enhancement of Fenton-like catalytic activity and selective H2O2 conversion to hydroxyl radicals, Applied Catalysis B: Environmental, 2018, pp. 223-233, 234.

* cited by examiner

*Primary Examiner* — Edward M Johnson
(74) *Attorney, Agent, or Firm* — Bayramoglu Law Offices LLC (57) ABSTRACT

A method for preparing a Fenton catalytic material includes the following steps: (1) placing a nitrogen-containing compound in a muffle furnace for calcination, then dissolving the product in deionized water to form a suspension solution; (2) dissolving aluminum nitrate nonahydrate, copper nitrate trihydrate and glucose in deionized water to form a solution; (3) adding the suspension solution in a dropwise manner to the solution, then performing a closed hydrothermal reaction, washing with water, centrifuging and drying to obtain a solid; and (4) placing the prepared solid in a muffle furnace for calcination to obtain the Fenton catalytic material. The catalytic material presents a complete ball-flower shaped mesoporous structure, has a large specific surface area and dual reaction centers to expose more catalytic active sites, so that $H_2O_2$ is reduced at the electron-rich center as much as possible to generate hydroxyl radicals during the reaction.

7 Claims, 9 Drawing Sheets

FENTON-LIKE CATALYTIC MATERIAL WITH DUAL REACTION CENTERS AND PREPARATION METHOD THEREOF

CROSS REFERENCE TO THE RELATED APPLICATIONS

This application is the national phase entry of International Application No. PCT/CN2018/120812, filed on Dec. 13, 2018, which is based upon and claims priority to Chinese Patent Application No. 201811311154.7, filed on Nov. 6, 2018, the entire contents of which are incorporated herein by reference.

TECHNICAL FIELD

The present invention belongs to the technical field of water treatment, and particularly relates to a Fenton catalytic material with dual reaction centers and a preparation method thereof.

BACKGROUND

Fenton reaction is an advanced oxidation technology and has been widely used in the field of water pollution control. The mechanism of the typical Fenton reaction process is that low-valence metal active species are first oxidized to high-valence metals by hydrogen peroxide ($H_2O_2$), where hydroxyl radicals (.OH) and superoxide radicals ($HO_2$./$O_2$.—) are produced, and then the high-valence metals generated by oxidation are further reduced by $H_2O_2$ to low-valence metals, which realizes the circulation of low-valence and high-valence metals. However, the traditional Fenton treatment technology has the following drawbacks: (1) the reaction needs to be carried out under acidic conditions, and a large amount of ferric sludge is generated during the reaction; (2) the reaction rate constant of high-valence metals being reduced to low-valence metals by hydrogen peroxide is much lower than that of low-valence metals being oxidized to high-valence metals by $H_2O_2$, which gradually limits the reaction process; (3) since the hydrogen peroxide functions as an electron donor (loses electrons and be oxidized to $HO_2$./$O_2$.—) and an electron acceptor (gains electrons and be converted to .OH) in the system at the same time, the utilization rate of $H_2O_2$ is low.

Chinese Patent Application No. 2016101211738 discloses a solid Fenton catalyst and a preparation method and application thereof. The patent relates to a copper-cobalt co-doped mesoporous alumina solid Fenton catalyst modified with σ-surface copper-graphitized carbon nitride coordination complex, which is obtained by the following steps: mixing glucose and aluminum isopropoxide to form an aqueous solution, adding the aqueous solution of copper salt and cobalt salt in a dropwise manner to the aqueous solution of glucose and aluminum isopropoxide, then stirring and mixing to obtain a mixture, adjusting the pH of the mixture to 5-5.5, letting the mixture stand, drying and calcining the mixture to obtain a product, adding the product to an aqueous solution of urea, and then stirring, evaporating, drying and calcining to obtain the final product. Although the catalyst effectively removes persistent toxic organic substances under neutral and weak acidity conditions at room temperature, the process for synthesizing the catalyst is complicated requiring two times of calcination. In addition, the active sites exposed in the pores of metal oxide are not sufficiently applied by introducing carbon nitride wrapped outside the metal oxide after the metal oxide is formed.

Chinese Patent Application No. 2014105464892 discloses a heterogeneous catalyst and the use thereof. The patent relates to a heterogeneous Fenton catalyst formed by loading hematite on the surface of a graphene-modified mesoporous molecular sieve (MCM-41) composite. Graphene is doped into mesoporous molecular sieve by in-situ synthetic thermal reduction to form a graphene-mesoporous MCM-41 composite. Then, ferric iron is loaded on the composite through an equal volume impregnation method, and a high temperature calcination is performed under the protection of nitrogen atmosphere to convert the ferric salt to a hematite ($\alpha$-$Fe_2O_3$) crystal. Finally, a graphene-MCM-41 composite loaded with iron oxide is formed. Although the heterogeneous Fenton catalyst synthesized in this patent effectively reduces the precipitation of iron ions during the reaction, the degradation process is carried out under acidic conditions, therefore, the heterogeneous Fenton catalyst has the drawback of unable to function in the actual wastewater near neutrality, thus increasing the treatment cost on adjusting the pH of the wastewater. In addition, as the repeat usage of the catalyst increases, the hematite loaded on the pores of graphene-mesoporous MCM-41 will fall off, lose active components and the like, which will affect the catalytic activity and stability of the material in the subsequent stage. Moreover, the problem of low utilization rate of hydrogen peroxide in the reaction process remains unresolved.

Chinese Patent Application No. 2017106050629 discloses a magnetic Fenton catalyst and a preparation method thereof. The patent relates to a magnetic $Fe_3O_4$/$CeO_2$ nano composite Fenton catalyst. The two-phase Fenton catalyst is finally obtained by in suit coating $Fe_3O_4$ on the surface of nano-$CeO_2$ particle under the protection of nitrogen atmosphere by post-loading. The catalyst needs a near acidic condition to perform a better degradation effect, which increases the cost of wastewater pretreatment. At the same time, the $Fe_3O_4$ coating on the surface of nano-$CeO_2$ particles is iron salt precipitation, therefore Fe is not bonded with Ce in the system. As the reaction time and the cycle numbers increase, the $Fe_3O_4$ coated on the surface will continue to precipitate into the solution to participate in the homogeneous Fenton reaction due to the basic characteristics of the Fenton reaction, resulting in a continuous decrease of one of the active components. Moreover, this catalyst still relies on the redox reaction of a single site of the metal to realize the activation of hydrogen peroxide, and the utilization rate of hydrogen peroxide in the system is still very low.

Chinese Patent Publication No. CN107754782A discloses a preparation method and a product of a self-supporting $VO_2$ Fenton catalytic material. The patent relates to a preparation method and a product of a self-supporting $VO_2$ Fenton catalyst. The synthesis procedure includes immersing a conductive base material in a $V_2O_5$ sol, performing an electrodeposition, and placing the obtained product in a tube furnace for calcination to finally form the self-supporting $VO_2$ Fenton catalyst. Preparing a precursor of the catalyst requires a long period of ageing. Moreover, $VO_2$, which is formed by the calcination of $V_2O_5$-coated steel mesh base material obtained by the electrodeposition method, almost completely wraps the Fe active components inside, so that the pollutants do not contact the active components well. Therefore, the entire Fenton reaction process takes a long time, and then the pollutants are effectively removed under acidic conditions, which is still in accordance with the mechanism of the typical Fenton reaction.

Nowadays, the research interest on the single homogeneous Fenton reaction has gradually changed to the research interest on the heterogeneous Fenton reaction. Solidifying metal ions to form metal oxides overcomes the problems of requiring low pH value, producing a large amount of iron sludge, solid-liquid separation and others. However, in a heterogeneous system, the conversion process between the high-valence metal and the low-valence metal still limits the reaction rate, and the utilization rate of hydrogen peroxide is still not high (lower than 30%). This series of problems remains unresolved, severely limiting the practical application of heterogeneous Fenton catalysts.

SUMMARY

The objective of the present invention is to provide a Fenton catalytic material with dual reaction centers and a preparation method thereof, therefore, solving the problems of high reaction mass transfer resistance and low utilization rate of hydrogen peroxide in the current research and application of Fenton technology.

The present invention is achieved by the following technical solutions.

A method for preparing a Fenton catalytic material with dual reaction centers, including the following steps:

(1) placing a nitrogen-containing compound in a corundum crucible, performing the calcination in a muffle furnace and maintaining the temperature to obtain the powdery product carbon nitride A; then dissolving the product A in deionized water, and stirring to form the suspension solution B;

(2) dissolving aluminum nitrate nonahydrate, copper nitrate trihydrate and glucose in deionized water to form the solution C;

(3) adding the suspension solution B prepared in step (1) in a dropwise manner into the solution C, stirring uniformly and transferring to a polytetrafluoroethylene reactor for a closed hydrothermal reaction to obtain a product, and water washing, centrifuging and drying the product to obtain the solid D; and (4) drying the solid D prepared in step (3), and then calcinating in a muffle furnace to obtain the Fenton catalytic material with dual reaction centers.

For the method for preparing the Fenton catalytic material with dual reaction centers according to the present invention, a further technical solution is that the nitrogen-containing compound in step (1) is one or more of urea, dicyandiamide, or melamine.

For the method for preparing the Fenton catalytic material with dual reaction centers according to the present invention, a further technical solution is that the calcination temperature in step (1) is 400° C.-600° C., the calcination time is 3-5 hours, and the heating rate during the calcination is 5-10° C./min.

For the method for preparing the Fenton catalytic material with dual reaction centers according to the present invention, a further technical solution is that the solution C in step (2) is prepared by adding 6.0-9.0 g of aluminum nitrate nonahydrate, 0.1-0.8 g of copper nitrate trihydrate and 4.0-8.0 g of glucose in 40-80 mL of deionized water.

For the method for preparing the Fenton catalytic material with dual reaction centers according to the present invention, a further technical solution is that the stirring rate in step (3) is 100-200 r/min, and the stirring time is 25-35 minutes.

For the method for preparing the Fenton catalytic material with dual reaction centers according to the present invention, a further technical solution is that the reaction temperature of the closed hydrothermal reaction in step (3) is 180° C.-220° C., and the reaction time is 15-25 hours.

For the method for preparing the Fenton catalytic material with dual reaction centers according to the present invention, a further technical solution is that in step (4), the heating rate of the solid D in the muffle furnace is 5-10° C./min, the calcination temperature is 450° C.-600° C., and the calcination time is 2-6 hours.

The Fenton catalytic material with dual reaction centers prepared by the above preparation method is also within the protective scope of the present invention. The catalytic material, as a whole, presents a ball-flower shape with an independent and complete structure and a uniform size, and the spherical surface is composed of a plurality of sheet monomers which are interlaced with each other. The nitrogen adsorption and desorption isotherms and the pore diameter distribution diagram show that the synthesized Fenton catalyst mainly have mesoporous structure, and the pore size is about 3.8 nm. The structural formula of the catalytic material is Cu—$Al_2O_3$-g-$C_3N_4$, wherein the mass fraction of Cu is 3.0-9.0%, and the mass fraction of $C_3N_4$ is 1.5-9.0%. During the Fenton reaction process, due to the presence of dual reaction centers on the surface of the catalytic material, the hydrogen peroxide can be selectively reduced to hydroxyl radicals in the electron-rich Cu center and undergo a water oxidation to produce hydroxyl radicals in the electron-deficient center.

The above-mentioned Fenton catalytic material with dual reaction centers is used in conjunction with $H_2O_2$ in water to form a Fenton system for treating and degrading organic pollutants in water. The organic pollutants include rhodamine B, bisphenol A, phenytoin, 2,4-dichlorophenoxyacetic acid, and methylene blue.

Figure 11:
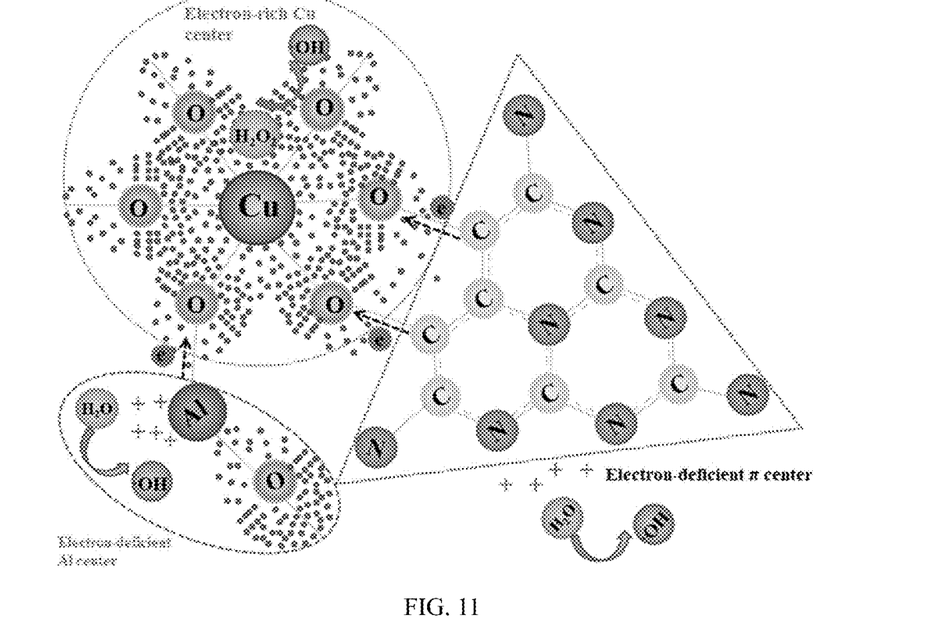
FIG. 11 is a diagram showing the mechanism of interaction between $Cu$—$Al_2O_3$-g-$C_3N_4$ according to the present invention and aqueous hydrogen peroxide solution.
Figure 21:
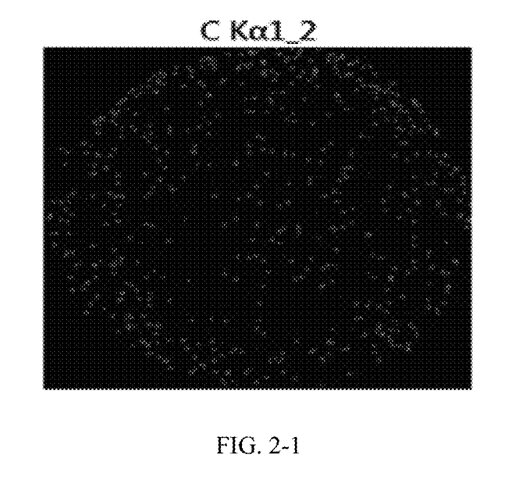
Figure 22:
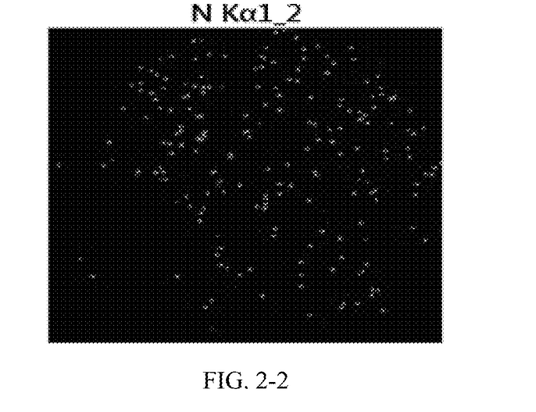
Figure 23:
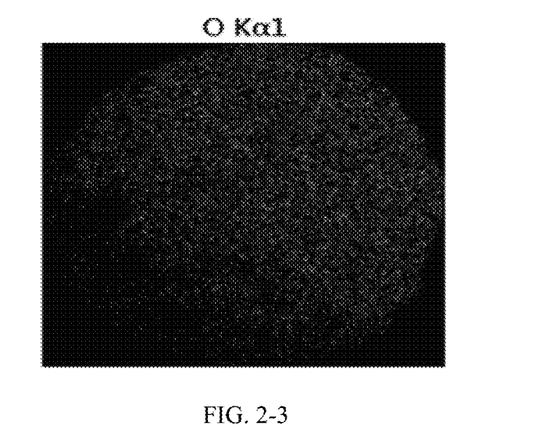
Figure 24:
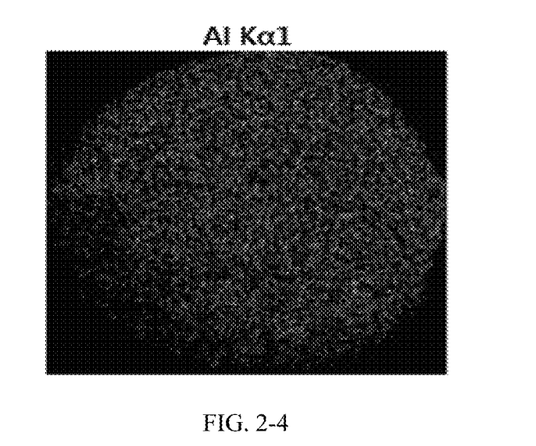
Figure 25:
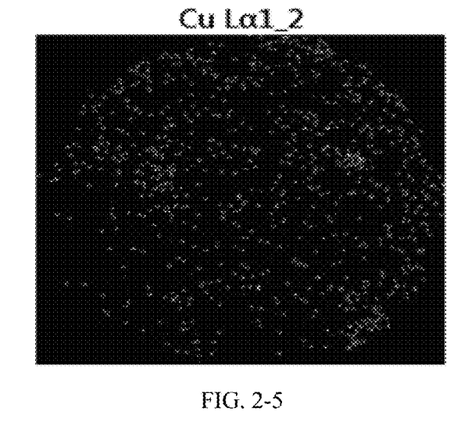

The experimental principle of the present invention is as follows: FIG. 11 shows that copper salt, aluminum salt, glucose and carbon nitride are self-assembled into a complete ball-flower shaped monomer particle Cu—$Al_2O_3$-g-$C_3N_4$ by the hydrothermal synthesis method; wherein the difference in electronegativity between Cu and Al causes the lattice oxygen doping of Cu to bond with the intrinsic element Al via a Al—O—Cu bond bridge, and forms the electron-rich Cu center and the electron-deficient Al center. In addition, the in-situ introduced carbon nitride is bonded to the metal Cu through the hydroxyl group on the surface thereof in a σ-bridged form of Cu—O—C (cation-π interaction), and the electron cloud on the conjugated π-bond in the carbon nitride structure is transferred to the Cu center, further forming the electron-rich Cu center and an electron-deficient π system. In the case of the electron polarization distribution, the free electrons around the electron-rich Cu center in the catalytic material selectively reduce $H_2O_2$ to .OH, while in the electron-deficient center (Al and conjugated π-bond), $H_2O$ is oxidized to generate .OH, thus to some extent, getting rid of the traditional Fenton reaction mode of generating hydroxyl radicals solely by relying on a single site of active metal. Due to the polarized electron distribution, the selective conversion of $H_2O_2$ and the oxidation of $H_2O$ to generate hydroxyl radicals are achieved, resulting in a significant increase in the generation rate of hydroxyl radicals and the utilization rate of hydrogen peroxide.

Compared with the traditional Fenton catalytic materials, the Fenton catalytic material prepared in the present invention has the following advantages:

1. The prepared Fenton catalytic material has a stable configuration and a large specific surface area, so that the catalytic material itself can expose more effective active sites.

2. The prepared catalytic material shows good catalytic activity on organic pollutants, such as bisphenol A (BPA), phenytoin (PHT), 2,4-dichlorophenoxyacetic acid (2,4-D), rhodamine B (Rh B) and methylene blue (MB), under neutral conditions. The prepared catalytic material also presents excellent stability.

3. The active metal component of the prepared Fenton catalytic material is Cu, which has a wider pH response range than the conventional Fe; the rate constant of the reduction of divalent Cu by $H_2O_2$ to monovalent Cu is much larger than the rate constant of the reduction of iron oxides; and the Cu species are more likely to complexing with phenolic organic ligands in solution.

4. The prepared Fenton catalytic material can selectively reduce hydrogen peroxide to hydroxyl radicals in the electron-rich Cu center due to the polarization distribution characteristic of the electrons on the surface, which greatly increases the utilization rate of hydrogen peroxide in the system.

BRIEF DESCRIPTION OF THE DRAWINGS

FIG. 2-1 is an energy dispersive spectroscopy (EDS) spectrum showing the distribution of carbon element in $Cu$—$Al_2O_3$-g-$C_3N_4$ according to the present invention.

FIG. 2-2 is an energy dispersive spectroscopy (EDS) spectrum showing the distribution of nitrogen element in $Cu$—$Al_2O_3$-g-$C_3N_4$ according to the present invention.

FIG. 2-3 is an energy dispersive spectroscopy (EDS) spectrum showing the distribution of oxygen element in $Cu$—$Al_2O_3$-g-$C_3N_4$ according to the present invention.

FIG. 2-4 is an energy dispersive spectroscopy (EDS) spectrum showing the distribution of aluminium element in $Cu$—$Al_2O_3$-g-$C_3N_4$ according to the present invention.

FIG. 2-5 is an energy dispersive spectroscopy (EDS) spectrum showing the distribution of copper element in $Cu$—$Al_2O_3$-g-$C_3N_4$ according to the present invention.

FIG. 3-1 shows the $N_2$ adsorption-desorption curve of $Cu$—$Al_2O_3$-g-$C_3N_4$ according to the present invention.

FIG. 3-2 shows the pore diameter distribution of $Cu$—$Al_2O_3$-g-$C_3N_4$ according to the present invention.

FIG. 5-1 shows the X-ray photoelectron spectroscopy (XPS) spectra of C1s orbital of $Cu$—$Al_2O_3$-g-$C_3N_4$ according to the present invention.

FIG. 5-2 shows the X-ray photoelectron spectroscopy (XPS) spectra of Cu 2p orbital of $Cu$—$Al_2O_3$-g-$C_3N_4$ according to the present invention.

FIG. 5-3 shows the X-ray photoelectron spectroscopy (XPS) spectra of Al 2p orbital of $Cu$—$Al_2O_3$-g-$C_3N_4$ according to the present invention.

FIG. 7-1 is a diagram showing the EPR signal of $HO_2\cdot/O_2\cdot^-$ in a suspension when 5,5-dimethyl-1-pyrroline 1-oxide (DMPO) is applied.

FIG. 7-2 is a diagram showing the EPR signal of .OH in the suspension when the DMPO is applied.

DETAILED DESCRIPTION OF THE EMBODIMENTS

The inventive contents of the present invention will be further described below with reference to the drawings and embodiments.

Embodiment 1

A method for preparing a Fenton catalytic material with dual reaction centers, including the following steps:

(1) 10 g of urea is placed in a corundum crucible for calcination in a muffle furnace at the temperature of 550° C., wherein the temperature is increased by the heating rate of 5° C./min, and then the temperature is maintained after the calcination for 4 hours to obtain the powdery product carbon nitride A. Then, the product A is dissolved in deionized water and stirred to form the suspension solution B; wherein the product A carbon nitride has the mass fraction of 4.5%.

(2) 6.0 g of aluminum nitrate nonahydrate, 0.18 g of copper nitrate trihydrate and 4.0 g of glucose are added to 40 mL of deionized water, and then stirred for 30 minutes to form the solution C.

(3) The suspension solution B prepared in step (1) is added in a dropwise manner to the solution C, stirred at the rate of 100 r/min for 30 minutes, and transferred to a polytetrafluoroethylene reactor for performing a closed hydrothermal reaction at 200° C. for 20 hours, then the product is washed with water, centrifuged, and dried to obtain the solid D.

(4) The solid D obtained in step (3) is dried, and then heated in a muffle furnace to 550° C. at the heating rate of 5° C./min, and then calcination is carried out for 4 hours to obtain the Fenton catalytic material with dual reaction centers.

Figure 1:
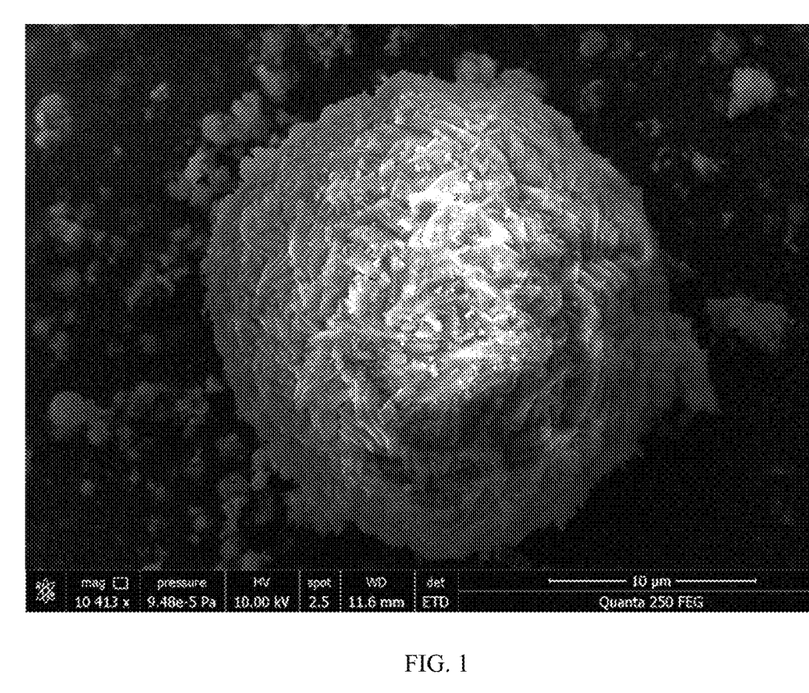
FIG. 1 is a scanning electron micrograph of $Cu$—$Al_2O_3$-g-$C_3N_4$ according to the present invention.
Figure 4:
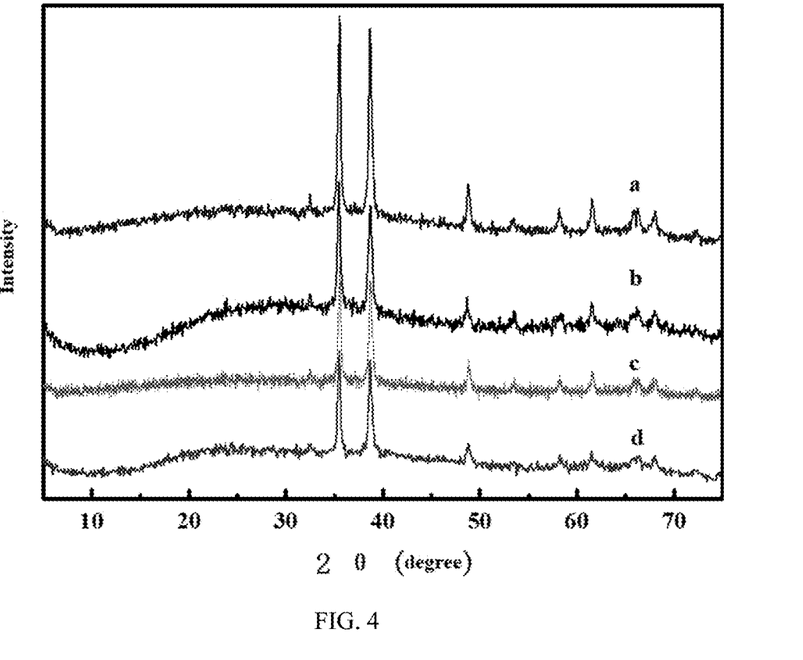
FIG. 4 shows X-ray diffraction patterns of $Cu$—$Al_2O_3$-g-$C_3N_4$ with different contents of Cu.

The catalytic material prepared above is characterized by scanning electron microscopy (SEM) and energy dispersive spectroscopy (EDS). FIG. 1 shows that the catalyst prepared by hydrothermal reaction and calcination presents a ball-flower shaped intact structure with a rough surface and is composed of a plurality of sheet monomers interlaced and stacked with each other. FIG. 2-1 to FIG. 2-5 show the three elements Cu, C and N are uniformly distributed in the bulk phase, indicating that the doped Cu elements are well distributed in the structure of $Al_2O_3$.

Embodiment 2

A method for preparing a Fenton catalytic material with dual reaction centers, including the following steps:

(1) 12 g of urea is placed in a corundum crucible for calcination in a muffle furnace at the temperature of 550° C., wherein the temperature is increased by the heating rate of 5° C./min, and then the temperature is maintained after the calcination for 4 hours to obtain the powdery product carbon nitride A. Then, the product A is dissolved in deionized water and stirred to form the suspension solution B; wherein the product A carbon nitride has the mass fraction of 4.5%.

(2) 6.5 g of aluminum nitrate nonahydrate, 0.24 g of copper nitrate trihydrate and 4.5 g of glucose are added to 80 mL of deionized water, and stirred for 30 minutes to form the solution C.

(3) The suspension solution B prepared in step (1) is added in a dropwise manner to the solution C, stirred at the rate of 120 r/min for 30 minutes, and transferred to a polytetrafluoroethylene reactor for performing a closed hydrothermal reaction at 200° C. for 18 hours, then the product is washed with water, centrifuged, and dried to obtain the solid D.

(4) The solid D obtained in step (3) is dried, and then heated in a muffle furnace to 550° C. at the heating rate of 5° C./min, and then calcination is carried out for 4 hours to obtain the Fenton catalytic material with dual reaction centers.

Figure 31:
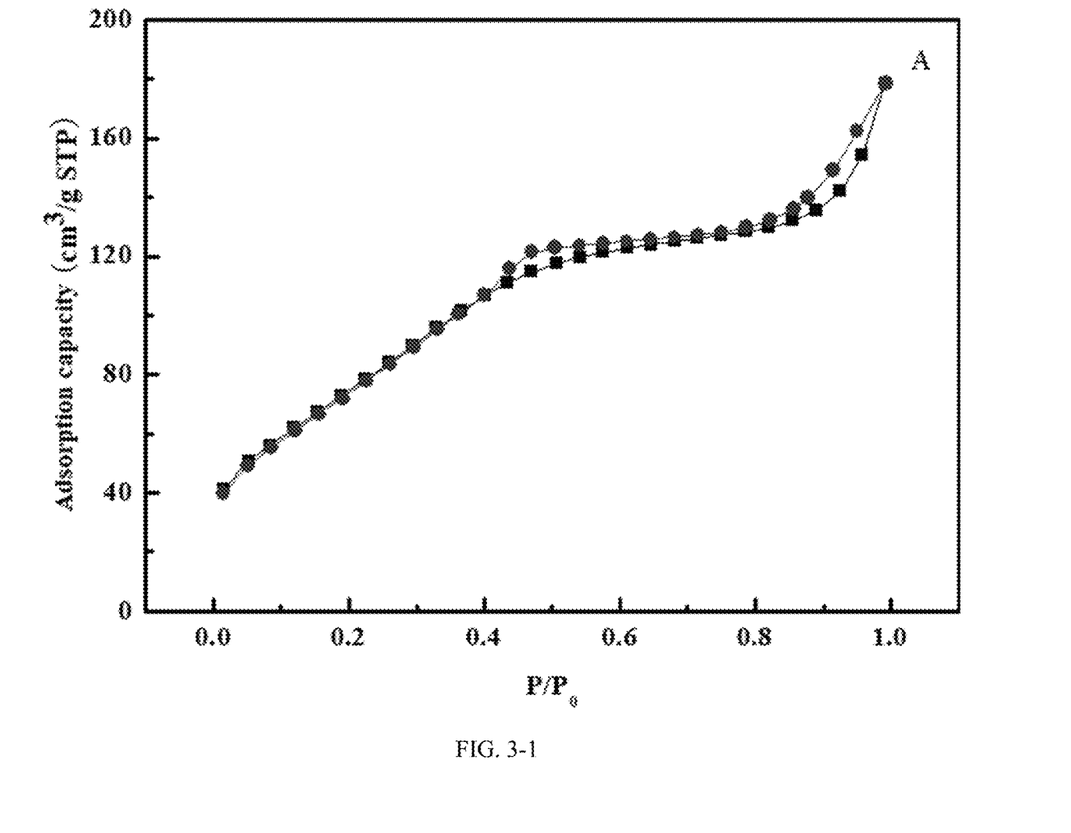
Figure 32:
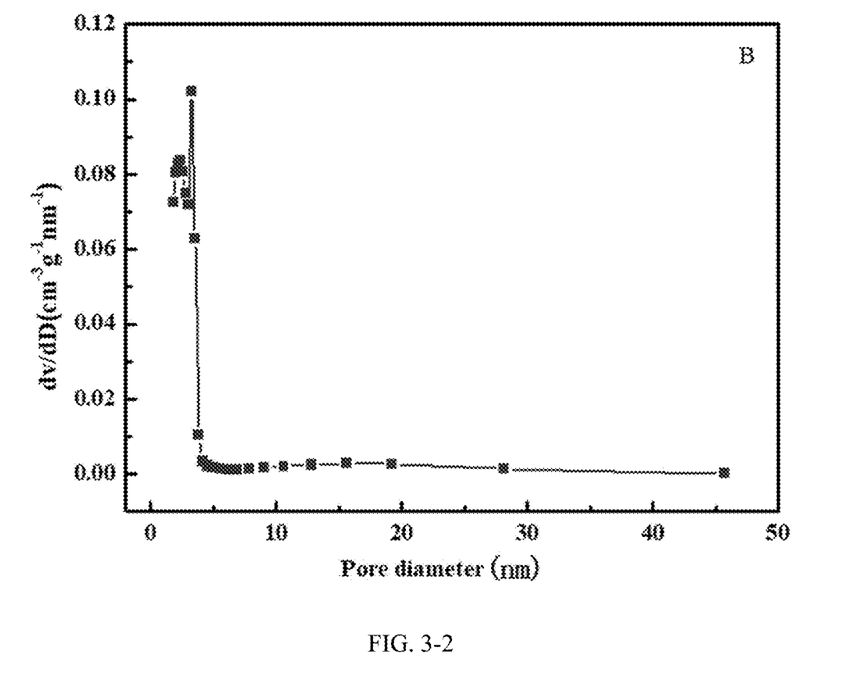

The catalytic material prepared above is subjected to measurements of $N_2$ adsorption and desorption curves and pore diameter distribution. FIG. 3-1 shows that the $N_2$ absorption/desorption isotherm of Cu—$Al_2O_3$-g-$C_3N_4$ has two distinct hysteresis loops. The first hysteresis loop at the relative pressure $P/P_0$=0.4-0.8 indicates that there is mainly mesoporous in the synthesized sample; and the second smaller hysteresis loop at the relative pressures $P/P_0$=0.8-1.0 indicates the presence of a small portion of larger mesoporous in the catalyst. According to FIG. 3-2, the pore diameter of mesoporous in the ball-flower shaped Cu—$Al_2O_3$-g-$C_3N_4$ is mainly distributed at about 4.7 nm, and the specific surface area of Cu—$Al_2O_3$-g-$C_3N_4$ calculated by the nitrogen adsorption-desorption isotherm is 224.12 m$^2$/g, and the pore volume is 0.345 cm$^3$/g.

Embodiment 3

A method for preparing a Fenton catalytic material with dual reaction centers, including the following steps:

(1) 15 g of urea is placed in a corundum crucible for calcination in a muffle furnace at the temperature of 550° C., wherein the temperature is increased by the heating rate of 5° C./min, and then the temperature is maintained after the calcination for 4 hours to obtain the powdery product carbon nitride A. Then, the product A is dissolved in deionized water and stirred to form the suspension solution B; wherein the product A carbon nitride has the mass fraction of 3.0%.

(2) 7.0 g of aluminum nitrate nonahydrate, 0.35 g of copper nitrate trihydrate and 5.0 g of glucose are added to 60 mL of deionized water, and stirred for 30 minutes to form the solution C.

(3) The suspension solution B prepared in step (1) is added in a dropwise manner to the solution C, stirred at the rate of 150 r/min for 30 minutes, and transferred to a polytetrafluoroethylene reactor for performing a closed hydrothermal reaction at 200° C. for 18 hours, then the product is washed with water, centrifuged, and dried to obtain the solid D.

(4) The solid D obtained in step (3) is dried, and then heated in a muffle furnace to 550° C. at the heating rate of 5° C./min, and then calcination is carried out for 4 hours to obtain the Fenton catalytic material with dual reaction centers.

Figure 51:
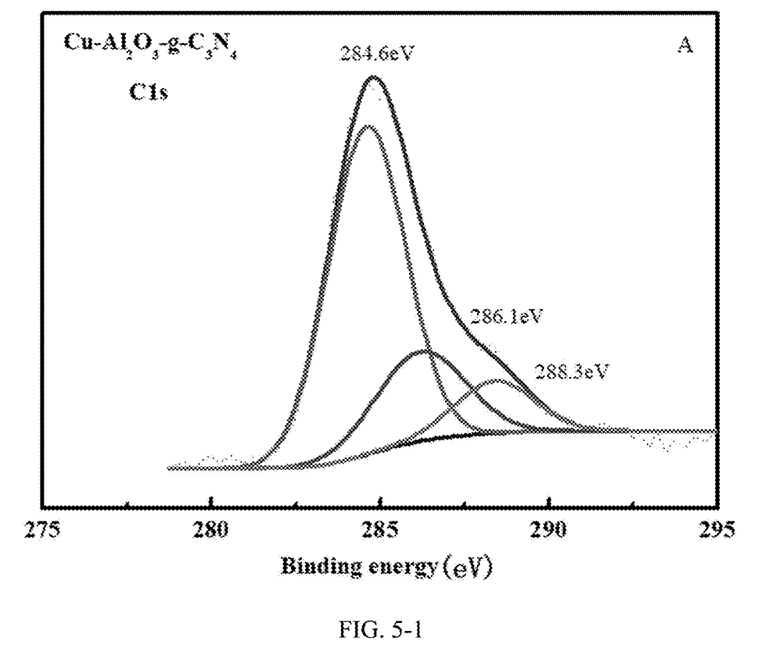
Figure 52:
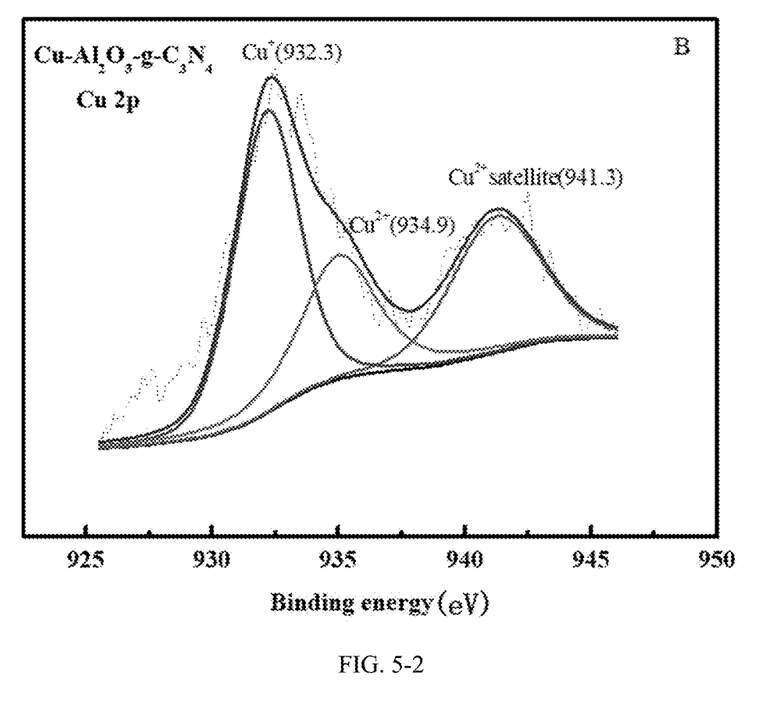
Figure 53:
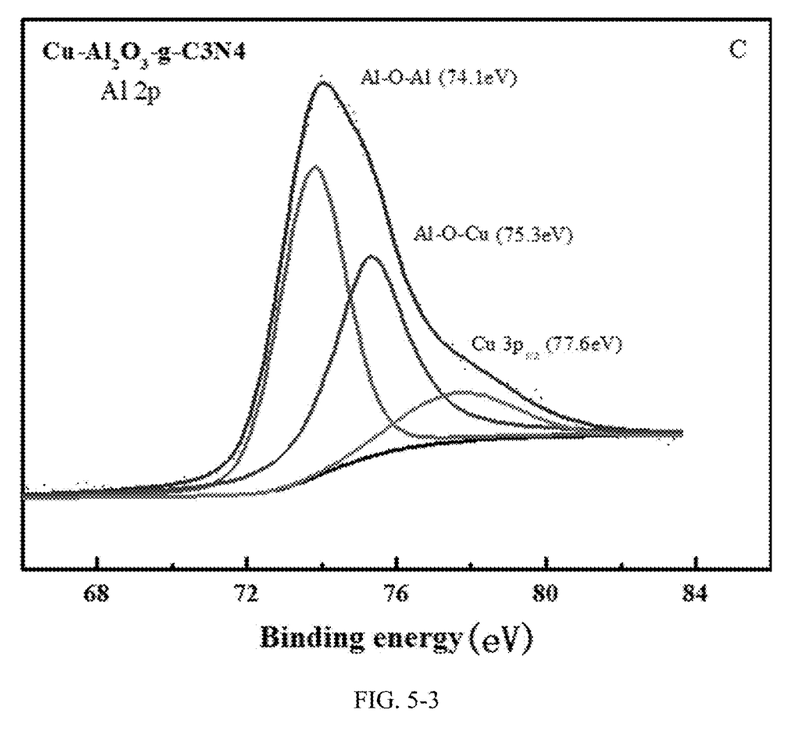
Figure 71:
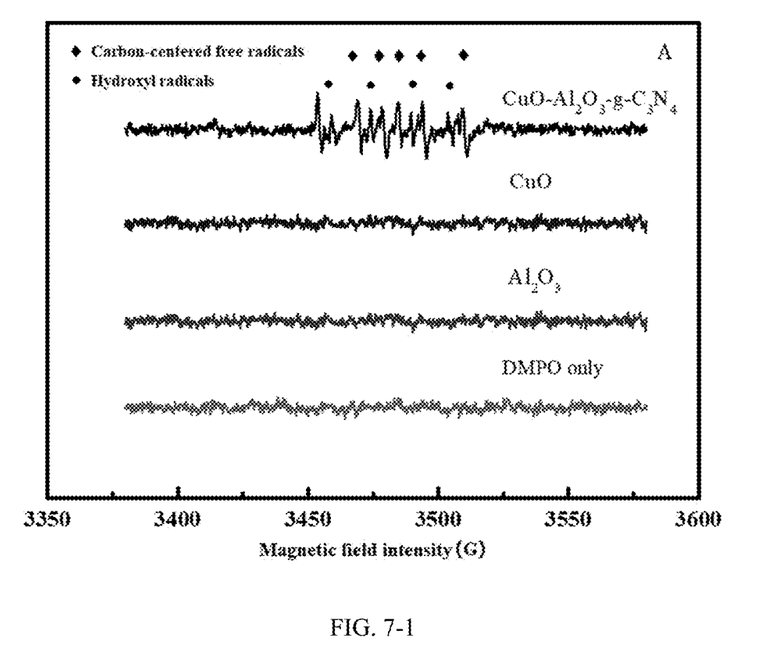
Figure 72:
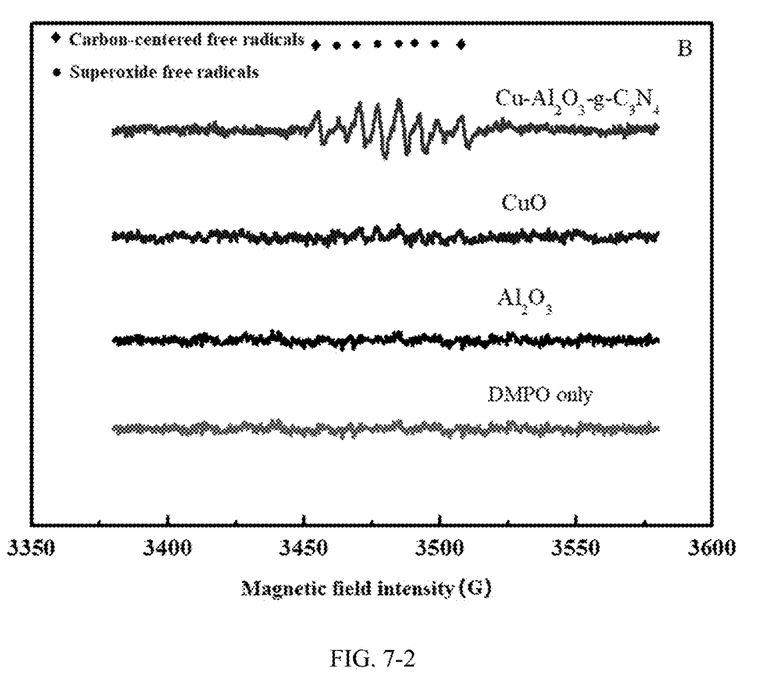

The catalytic material prepared above is characterized by XPS. FIG. 5-1 to FIG. 5-3 show[[s]] the peak near 286.1 eV and the peak at 285.7 eV in Cu—$Al_2O_3$-g-$C_3N_4$ are characteristic peaks indicating the bonding between C atom in the benzene ring structure and hydroxy group (C—O—H/C—O-metal), therefore, there is a C—O—Cu bond bridge between Cu and $C_3N_4$ in Cu—$Al_2O_3$-g-$C_3N_4$. The XPS spectrum on the Cu 2p orbital presents three characteristic peaks, the peak near 932.1 eV is attributed to the characteristic peak of $Cu^+$, the peak located at 943.1-934.9 eV is attributed to the characteristic peak of $Cu^+$, and the peak located near 941.2 eV is the satellite peak of $Cu^+$. The binding energy peak at 75.3-75.4 eV in the Al 2p orbital is the characteristic peak of the Al—O—Cu bond, indicating that Cu is doped into the skeleton of $Al_2O_3$.

Embodiment 4

A method for preparing a Fenton catalytic material with dual reaction centers, including the following steps:

(1) 15 g of urea is placed in a corundum crucible for calcination in a muffle furnace at the temperature of 550° C., wherein the temperature is increased by the heating rate of 5° C./min, and then the temperature is maintained after the calcination for 4 hours to obtain the powdery product carbon nitride A. Then, the product A is dissolved in deionized water and stirred to form the suspension solution B; wherein the product A carbon nitride has the mass fraction of 4.5%.

(2) 7.5 g of aluminum nitrate nonahydrate, 0.6 g of copper nitrate trihydrate and 5.0 g of glucose are added to 60 mL of deionized water, and stirred for 30 minutes to form the solution C.

(3) The suspension solution B prepared in step (1) is added in a dropwise manner to the solution C, stirred at the rate of 150 r/min for 30 minutes, and transferred to a polytetrafluoroethylene reactor for performing a closed hydrothermal reaction at 200° C. for 20 hours, then the product is washed with water, centrifuged, and dried to obtain the solid D.

(4) The solid D obtained in step (3) is dried, and then heated in a muffle furnace to 550° C. at the heating rate of 5° C./min, and then calcination is carried out for 4 hours to obtain the Fenton catalytic material with dual reaction centers.

Figure 6:
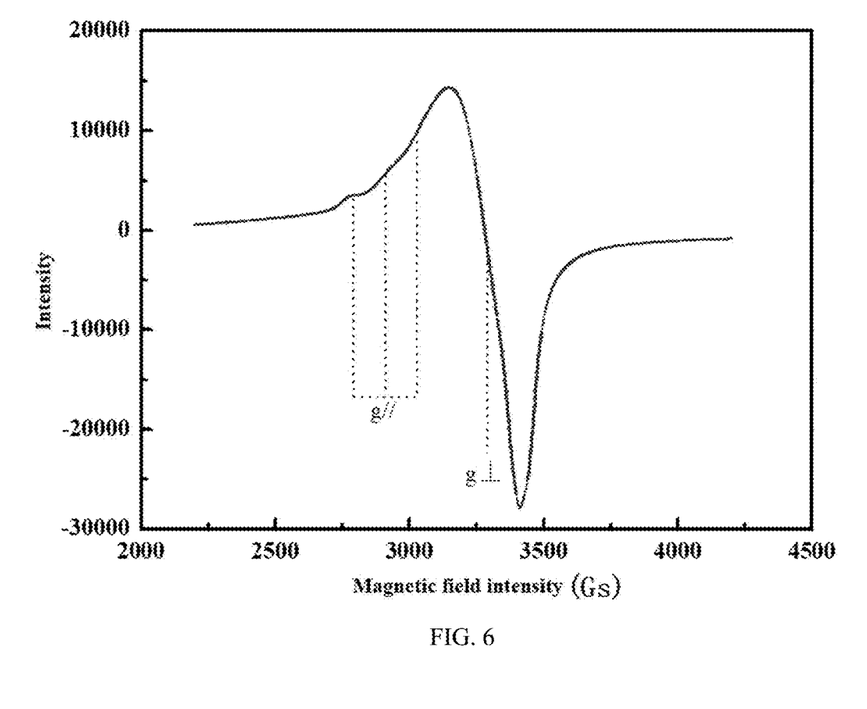
FIG. 6 is an electron paramagnetic resonance (EPR) spectrum of Cu element in $Cu$—$Al_2O_3$-g-$C_3N_4$ according to the present invention.

The catalytic material prepared above is characterized by EPR. FIG. 6 shows, the Cu element solid EPR shows a strong signal with a hyperfine coupling structure, which is the typical feature of Cu(II) with a spin of I=3/2. The g factor and A value of the Cu—$Al_2O_3$-g-$C_3N_4$ sample are shown in the following table:

| Sample | g// | g⊥ | A//(G) |
|---|---|---|---|
| Cu—$Al_2O_3$-g-$C_3N_4$ | 2.394 | 2.126 | 151 |

According to the above table, g∥>g⊥>2.0023 (ge), indicating that the unpaired electrons present on the surface of the catalyst are located in the $d_{x2-y2}$ orbital of Cu(II), and the value range of the g factor and the EPR signal shape of Cu—$Al_2O_3$-g-$C_3N_4$ conform to the existence form of Cu(II) in the hexa-coordinate octahedral geometric construction. The above results show that, due to the difference in electronegativity between Al and Cu, the co-doping of Cu on $Al_2O_3$ causes the non-uniform distribution of electrons on the surface of the catalyst, and since the electronegativity of Cu is higher than that of Al, the electron cloud density around Cu is enhanced, and correspondingly the electron-deficient Al center is produced. In addition, the in-situ introduced carbon nitride is bonded to the metal Cu through the hydroxyl group on the surface thereof in a σ-bridged form of Cu—O—C (cation-π interaction), and the electron cloud on the conjugated π-bond in the carbon nitride structure is transferred to the Cu center, further forming the electron-rich Cu center and an electron-deficient π system.

Embodiment 5

A method for preparing a Fenton catalytic material with dual reaction centers, including the following steps:

(1) 15 g of urea is placed in a corundum crucible for calcination in a muffle furnace at the temperature of 500° C., wherein the temperature is increased by the heating rate of 5° C./min, and then the temperature is maintained after the calcination for 4 hours to obtain the powdery product carbon nitride A. Then, the product A is dissolved in deionized water and stirred to form the suspension solution B; wherein the product A carbon nitride has the mass fraction of 3.0%.

(2) 7.5 g of aluminum nitrate nonahydrate, 0.6 g of copper nitrate trihydrate and 5.0 g of glucose are added to 60 mL of deionized water, and stirred for 30 minutes to form the solution C.

(3) The suspension solution B prepared in step (1) is added in a dropwise manner to the solution C, stirred at the rate of 150 r/min for 30 min, and transferred to a polytetrafluoroethylene reactor for performing a closed hydrothermal reaction at 210° C. for 21 hours, then the product is washed with water, centrifuged, and dried to obtain the solid D.

(4) The solid D obtained in step (3) is dried, and then heated in a muffle furnace to 550° C. at the heating rate of 5° C./min, and then calcination is carried out for 4 hours to obtain the Fenton catalytic material with dual reaction centers.

Figure 8:
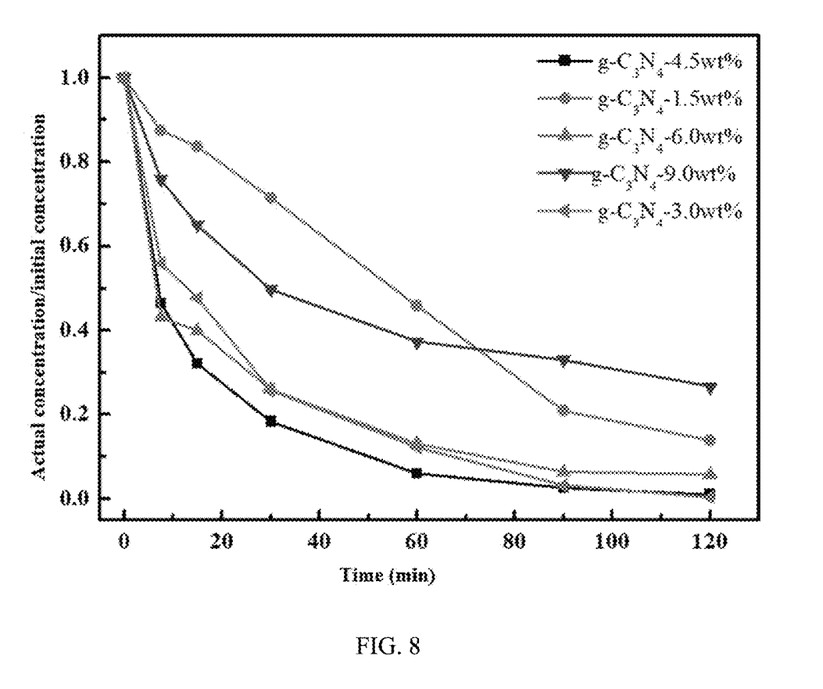
FIG. 8 is a diagram showing degradation effects of $Cu$—$Al_2O_3$-g-$C_3N_4$ with different contents of $C_3N_4$ on rhodamine B with the initial concentration of 10 ppm.

(5) 10 mg/L Rh B solution is prepared and placed in a 150 mL Erlenmeyer flask, and 0.05 g of the catalytic material prepared in step (4) is added to the Erlenmeyer flask to obtain a mixed solution, and then the Erlenmeyer flask is placed in a thermostat water bath at 35° C. and the mixed solution is stirred for 30 minutes to achieve adsorption equilibrium. Then, 12.5 mL of hydrogen peroxide solution with the mass fraction of 30% is added, and 1.5 mL of the reaction solution is taken out every 10 minutes to pass through a 0.45 μm filter. Then, the concentrations of Rh B at different reaction times are measured by an ultraviolet-visible spectrophotometer. FIG. 8 shows the Fenton catalyst where the mass fraction of carbon nitride is 1.5% has a better degradation effect on Rh B under neutral conditions, and the removal rate within 120 minutes reaches over 80%.

Embodiment 6

A method for preparing a Fenton catalytic material with dual reaction centers, including the following steps:

(1) 15 g of urea is placed in a corundum crucible for calcination in a muffle furnace at the temperature 600° C., wherein the temperature is increased by the heating rate of 5° C./min, and then the temperature is maintained after the calcination for 4 hours to obtain the powdery product carbon nitride A. Then, the product A is dissolved in deionized water and stirred to form the suspension solution B; wherein the product A carbon nitride has the mass fraction of 3.0%.

(2) 7.5 g of aluminum nitrate nonahydrate, 0.6 g of copper nitrate trihydrate and 5.0 g of glucose are added to 60 mL of deionized water, and stirred for 30 minutes to form the solution C.

(3) The suspension solution B prepared in step (1) is added in a dropwise manner to the solution C, stirred at the rate of 150 r/min for 30 minutes, and transferred to a polytetrafluoroethylene reactor for performing a closed hydrothermal reaction at 220° C. for 25 hours, then the product is washed with water, centrifuged, and dried to obtain the solid D.

(4) The solid D obtained in step (3) is dried, and then heated in a muffle furnace to 550° C. at the heating rate of 5° C./min, and then calcination is carried out for 6 hours to obtain the Fenton catalytic material with dual reaction centers.

(5) 10 mg/L Rh B solution is prepared and placed in a 150 mL Erlenmeyer flask, and 0.05 g of the catalytic material prepared in step (4) is added to the Erlenmeyer flask to obtain a mixed solution, and then the Erlenmeyer flask is placed in a thermostat water bath at 35° C. and the mixed solution is stirred for 30 minutes to achieve adsorption equilibrium. Then, 12.5 mL of hydrogen peroxide solution with a mass fraction of 30% is added, and 1.5 mL of the reaction solution is taken out every 15 minutes to pass through a 0.45 μm filter. Then, the concentrations of Rh B at different reaction times are measured by an ultraviolet-visible spectrophotometer. FIG. 8 shows the Fenton catalyst where the mass fraction of carbon nitride is 3.0% has a better degradation effect on Rh B under neutral conditions, and the removal rate within 90 minutes reaches over 95%.

Embodiment 7

A method for preparing a Fenton catalytic material with dual reaction centers, including the following steps:

(1) 15 g of urea is placed in a corundum crucible for calcination in a muffle furnace at the temperature of 500° C., wherein the temperature is increased by the heating rate of 5° C./min, and then the temperature is maintained after the calcination for 4 hours to obtain the powdery product carbon nitride A. Then, the product A is dissolved in deionized water and stirred to form the suspension solution B; wherein the product A carbon nitride has the mass fraction of 6.0%.

(2) 7.5 g of aluminum nitrate nonahydrate, 0.6 g of copper nitrate trihydrate and 5.0 g of glucose are added to 60 mL of deionized water, and stirred for 30 minutes to form the solution C.

(3) The suspension solution B prepared in step (1) is added in a dropwise manner to the solution C, stirred at the rate of 150 r/min for 30 minutes, and transferred to a polytetrafluoroethylene reactor for performing a closed hydrothermal reaction at 200° C. for 18 hours, then the product is washed with water, centrifuged, and dried to obtain the solid D.

(4) The solid D obtained in step (3) is dried, and then heated in a muffle furnace to 550° C. at the heating rate of 5° C./min, and then calcination is carried out for 4 hours to obtain the Fenton catalytic material with dual reaction centers.

(5) 10 mg/L Rh B solution is prepared and placed in a 150 mL Erlenmeyer flask, and 0.05 g of the catalytic material prepared in step (4) is added to the Erlenmeyer flask to obtain a mixed solution, and then the Erlenmeyer flask is placed in a thermostat water bath at 35° C. and the mixed solution is stirred for 30 minutes to achieve adsorption equilibrium. Then, 12.5 mL of hydrogen peroxide solution with a mass fraction of 30% is added, and 1.5 mL of the reaction solution is taken out every 15 minutes to pass through a 0.45 μm filter. Then, the concentrations of Rh B at different reaction times are measured by an ultraviolet-visible spectrophotometer. FIG. 8 shows the Fenton catalyst where the mass fraction of carbon nitride is 6.0% has a better degradation effect on Rh B under neutral conditions, and the removal rate within 90 minutes reaches over 92%.

Embodiment 8

A method for preparing a Fenton catalytic material with dual reaction centers, including the following steps:

(1) 15 g of urea is placed in a corundum crucible for calcination in a muffle furnace at the temperature of 500° C., wherein the temperature is increased by the heating rate of 5° C./min, and then the temperature is maintained after the calcination for 4 hours to obtain the powdery product carbon nitride A. Then, the product A is dissolved in deionized water and stirred to form the suspension solution B; wherein the product A carbon nitride has the mass fraction of 9.0%.

(2) 7.5 g of aluminum nitrate nonahydrate, 0.6 g of copper nitrate trihydrate and 5.0 g of glucose are added to 60 mL of deionized water, and stirred for 30 minutes to form the solution C.

(3) The suspension solution B prepared in step (1) is added in a dropwise manner to the solution C, stirred at the rate of 150 r/min for 30 minutes, and transferred to a polytetrafluoroethylene reactor for performing a closed hydrothermal reaction at 200° C. for 10 hours, then the product is washed with water, centrifuged, and dried to obtain the solid D.

(4) The solid D obtained in step (3) is dried, and then heated in a muffle furnace to 500° C. at the heating rate of 5° C./min, and then calcination is carried out for 4 hours to obtain the Fenton catalytic material with dual reaction centers.

(5) 10 mg/L Rh B solution is prepared and placed in a 150 mL Erlenmeyer flask, and 0.05 g of the catalytic material prepared in step (4) is added to the Erlenmeyer flask to obtain a mixed solution, and then the Erlenmeyer flask is placed in a thermostat water bath at 35° C. and the mixed solution is stirred for 30 minutes to achieve adsorption equilibrium. Then, 12.5 mL of hydrogen peroxide solution with the mass fraction of 30% is added, and 1.5 mL of the reaction solution is taken out every 20 minutes to pass through a 0.45 μm filter. Then, the concentrations of Rh B at different reaction times are measured by an ultraviolet-visible spectrophotometer. FIG. 8 shows the Fenton catalyst where the mass fraction of carbon nitride is 9.0% has a better degradation effect on Rh B under neutral conditions, and the removal rate within 90 minutes reaches over 75%.

Embodiment 9

A method for preparing a Fenton catalytic material with dual reaction centers, including the following steps:

(1) 15 g of urea is placed in a corundum crucible for calcination in a muffle furnace at the temperature of 550° C., wherein the temperature is increased by the heating rate of 5° C./min, and then the temperature is maintained after the calcination for 4 hours to obtain the powdery product carbon nitride A. Then, the product A is dissolved in deionized water and stirred to form the suspension solution B; wherein the product A carbon nitride has the mass fraction of 9.0%.

(2) 9.0 g of aluminum nitrate nonahydrate, 0.8 g of copper nitrate trihydrate and 8.0 g of glucose are added to 60 mL of deionized water, and stirred for 30 minutes to form the solution C.

(3) The suspension solution B prepared in step (1) is added in a dropwise manner to the solution C, stirred at the rate of 200 r/min for 30 minutes, and transferred to a polytetrafluoroethylene reactor for performing a closed hydrothermal reaction at 200° C. for 20 hours, then the product is washed with water, centrifuged, and dried to obtain the solid D.

(4) The solid D obtained in step (3) is dried, and then heated in a muffle furnace to 550° C. at the heating rate of 5° C./min, and then calcination is carried out for 4 hours to obtain the Fenton catalytic material with dual reaction centers.

Figure 9:
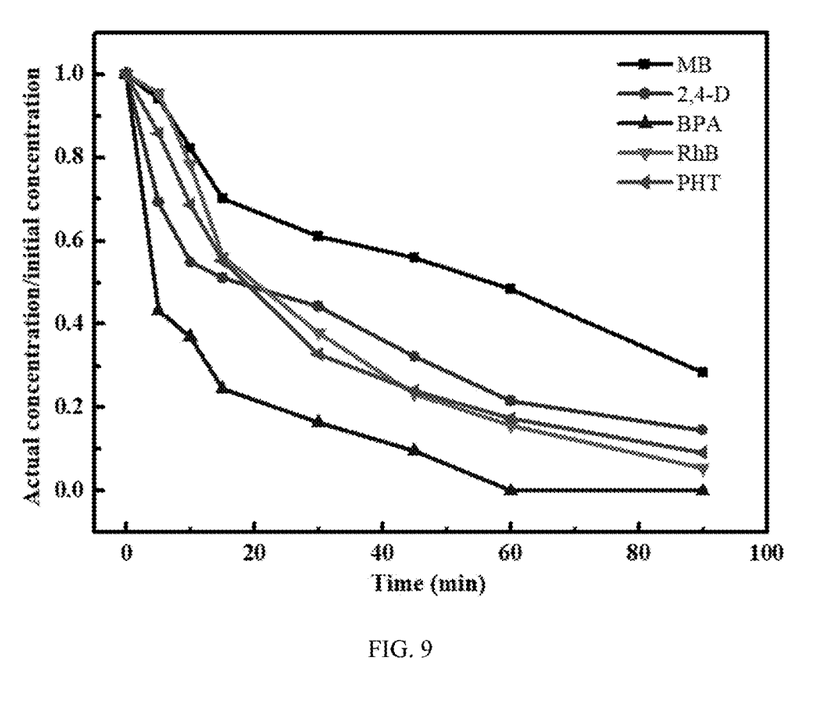
FIG. 9 is a diagram showing degradation rates of the organic substances of BPA, PHT, 2, 4-D, MB and Rh B by $Cu$—$Al_2O_3$-g-$C_3N_4$ according to the present invention.
Figure 10:
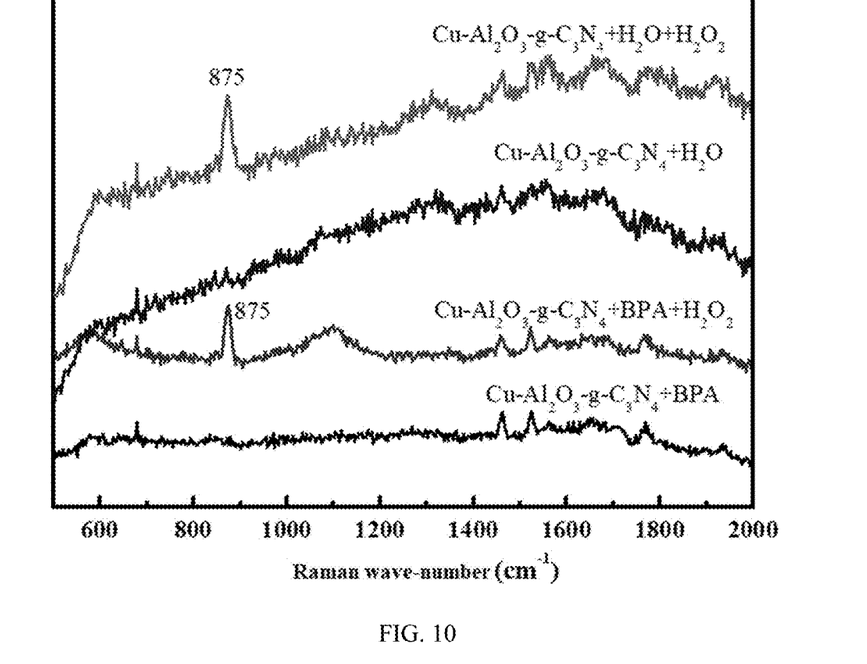
FIG. 10 is a diagram showing in-situ Raman spectra of $Cu$—$Al_2O_3$-g-$C_3N_4$ according to the present invention in different organic substance systems.

(5) 10 mg/L of BPA, PHT, 2,4-D, MB and Rh B solutions are prepared and placed in a 150 mL Erlenmeyer flask, respectively, and 0.05 g of the catalytic material prepared in step (4) is added to the Erlenmeyer flask, respectively, to obtain mixed solutions, and then each Erlenmeyer flask is placed in a thermostat water bath at 35° C. and each mixed solution is stirred for 30 minutes to achieve adsorption equilibrium. Then, 12.5 mL of hydrogen peroxide solution with the mass fraction of 30% is added, respectively, and 1.5 mL of the reaction solution is taken out every 20 minutes to pass through a 0.45 μm filter. Then, the concentrations of pollutants at different reaction times are determined by high performance liquid chromatography (HPLC). FIG. 9 shows the Fenton catalyst exhibits good degradation effects on the five organic substances under neutral conditions.

The foregoing descriptions are merely preferred embodiments of the present invention, and it should be noted that various modifications and improvements can be made by those skilled in the art without departing from the inventive conceptions of the present invention. Those modifications and improvements fall within the protective scope of the present invention.

What is claimed is:

1. A method for preparing a Fenton catalytic material with dual reaction centers, comprising the following steps:
   (1) placing a nitrogen-containing compound in a corundum crucible, performing a first calcination on the nitrogen-containing compound in a muffle furnace and keeping a temperature to obtain a powdery carbon nitride; then dissolving the powdery carbon nitride in deionized water, and stirring to form a suspension solution;
   (2) dissolving aluminum nitrate nonahydrate, copper nitrate trihydrate and glucose in deionized water to form a first solution;
   (3) adding the suspension solution prepared in step (1) in a dropwise manner to the first solution to obtain a second solution, stirring the second solution uniformly and transferring the second solution to a polytetrafluoroethylene reactor for a closed hydrothermal reaction to obtain a product, and water washing, centrifuging and drying the product to obtain a solid; and
   (4) drying the solid prepared in step (3), and then performing a second calcination on the solid in the muffle furnace to obtain the Fenton catalytic material with the dual reaction centers.

2. The method for preparing the Fenton catalytic material with the dual reaction centers according to claim 1, wherein the nitrogen-containing compound in step (1) is one or more selected from the group consisting of urea, dicyandiamide, or melamine.

3. The method for preparing the Fenton catalytic material with the dual reaction centers according to claim 1, wherein in the first calcination of step (1), a calcination temperature is 400° C.-600° C., a calcination time is 3-5 hours, and a heating rate is 5-10° C./min.

4. The method for preparing the Fenton catalytic material with the dual reaction centers according to claim 1, wherein in step (2), a mass of the aluminum nitrate nonahydrate is 6.0-9.0 g, a mass of the copper nitrate trihydrate is 0.1-0.8 g, a mass of the glucose is 4.0-8.0 g, and a volume of the deionized water is 40-80 mL.

5. The method for preparing the Fenton catalytic material with the dual reaction centers according to claim 1, wherein in step (3), a stirring rate is 100-200 r/min, and a stirring time is 25-35 minutes.

6. The method for preparing the Fenton catalytic material with the dual reaction centers according to claim 1, wherein in step (3), a reaction temperature of the closed hydrothermal reaction is 180° C.-220° C., and a reaction time of the closed hydrothermal reaction is 15-25 hours.

7. The method for preparing the Fenton catalytic material with the dual reaction centers according to claim 1, wherein in the second calcination of step (4), a heating rate of the solid is 5-10° C./min, a calcination temperature is 450° C.-600° C., and a calcination time is 2-6 hours.

* * * * *